(No Model.) 2 Sheets—Sheet 1.
G. W. MELVILLE.
AUTOMATIC GRAVITY CLOSING WATER TIGHT DOOR.
No. 542,169. Patented July 2, 1895.
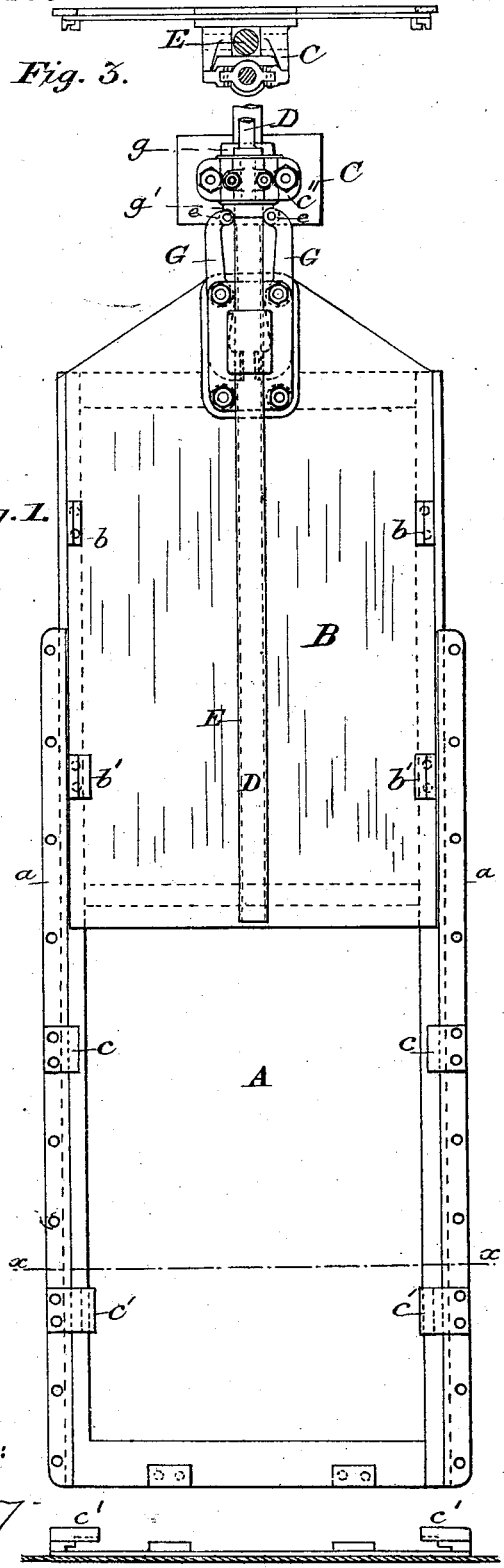
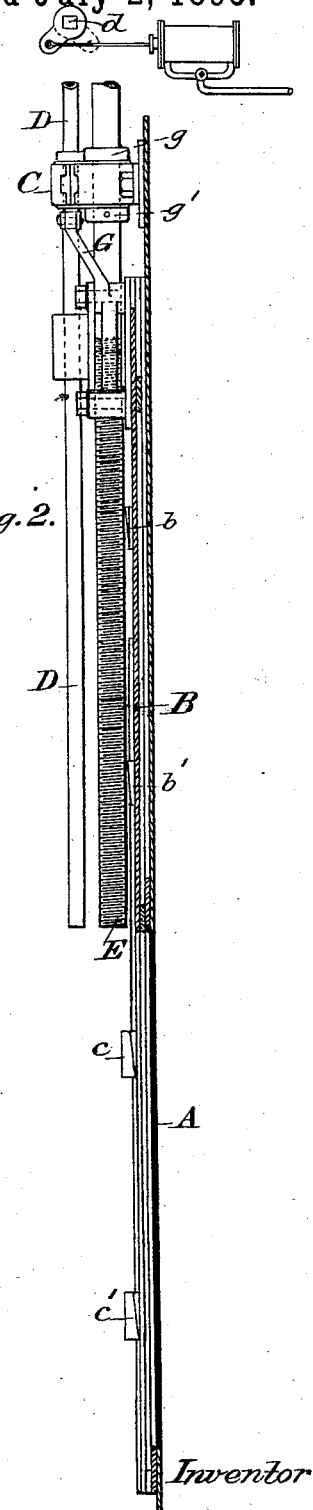
Witnesses:
Inventor:
George W. Melville,
By T. C. Brecht,
Attorney.

(No Model.) 2 Sheets—Sheet 2.
G. W. MELVILLE.
AUTOMATIC GRAVITY CLOSING WATER TIGHT DOOR.
No. 542,169. Patented July 2, 1895.
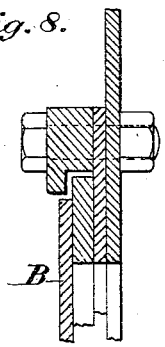
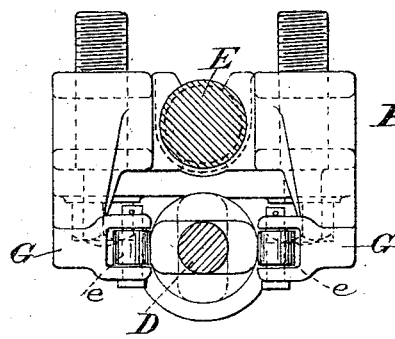
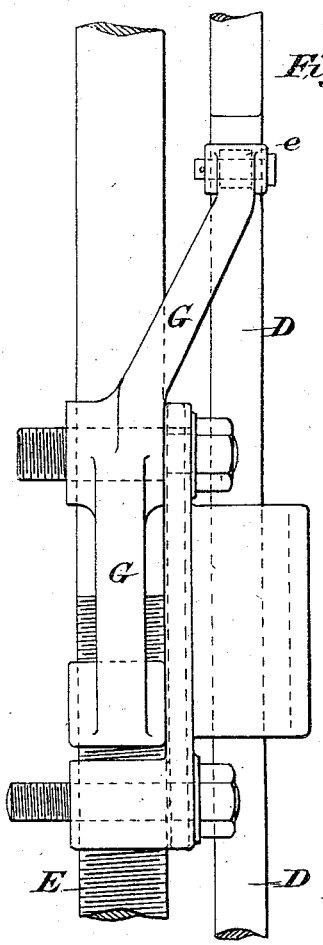
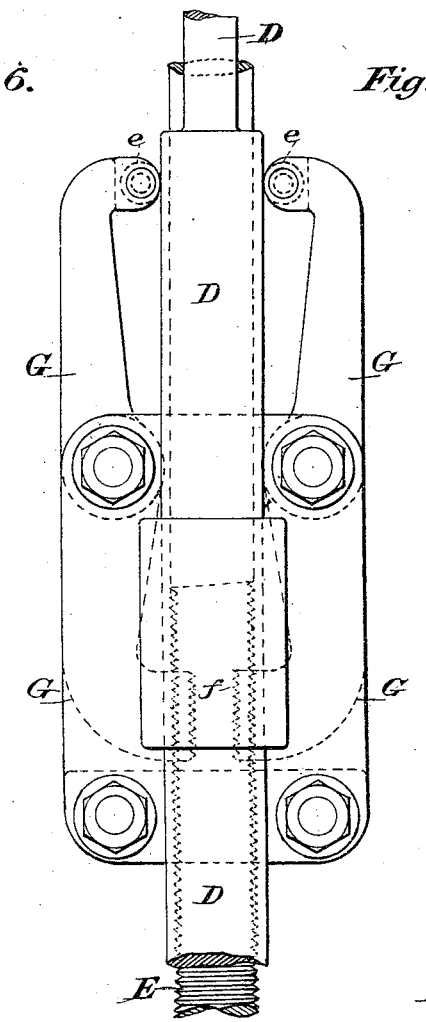
Witnesses:
Inventor:
George W. Melville,
By T. C. Brecht
Attorney.

UNITED STATES PATENT OFFICE.

GEORGE W. MELVILLE, OF WASHINGTON, DISTRICT OF COLUMBIA.

AUTOMATIC GRAVITY-CLOSING WATER-TIGHT DOOR.

SPECIFICATION forming part of Letters Patent No. 542,169, dated July 2, 1895.

Application filed March 11, 1895. Serial No. 541,284. (No model.)

*To all whom it may concern:*

Be it known that I, GEORGE W. MELVILLE, a citizen of the United States, residing at Washington, in the District of Columbia, have invented certain new and useful Improvements in Automatic Gravity-Closing Water-Tight Doors; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in apparatus for opening and closing doors, valves, &c., on vessels, caissons, mines, or any other place where it is desirable to close a door or valve in a water or air tight manner.

The objects of the invention are to construct an apparatus of very simple construction and operation that is not liable to get out of order and is always reliable; also, that is readily applicable to old as well as new vessels, more especially for use in their bulkheads; furthermore, to make the door, valve, &c., in such manner that it will move freely or drop automatically and of its own weight when released, and, finally, to make it practically tight when closed by making it either of wedge shape or by fitting it with wedge-shaped lugs or projections to force it against its seating surface.

With these objects in view my invention consists, in connection with a door, valve, &c., more especially for vessels, caissons, mines, &c., but applicable to other purposes, of one or more nuts or dogs, made in two or more parts, having threads or their equivalents engaging with threads on a screw or lifting device and actuated by a rod of irregular cross-section and either directly or indirectly connected by levers, springs, &c. The door, valve, or analogous device may be made tight when in position by being of wedge shape or by having wedge-shaped lugs or projections to force it against its seating surface.

It also consists in the construction of certain details and the peculiar arrangement of parts, as will be more fully described hereinafter and specifically pointed out in the claims, reference being had to the accompanying drawings and the letters marked thereon.

Like letters indicate similar parts in the different figures of the drawings, in which—

Figure 1 represents a front elevation of my improvements attached to a door in open position. Fig. 2 is a vertical section of the same. Fig. 3 is a top view of Fig. 1. Fig. 4 is a cross-section on line $xx$ of Fig. 1. Fig. 5 is a front view of the nuts or dogs on an enlarged scale. Fig. 6 is a side view of the same. Fig. 7 is a top view of Fig. 5. Fig. 8 is a view of the doubling-plate of the door.

In the drawings, A represents an opening in a bulk-head or its equivalent, of any suitable size, having side pieces $a$ secured to it for forming the ways for the sliding door B. To this door the lugs or wedges $b\ b'$ are riveted, by which the door is forced against its seating-surface, and keepers $c\ c'$ to hold it in place are secured to the bulk-head at the edges of the opening. The upper keepers $c$ on the bulk-head are made shorter or narrower or thicker or thinner than the lower ones, and of the same width so as to allow the lower wedges $b$ of the door B to pass them and to engage with the wedge part of the lower keepers $c'$. A short distance above the upper part of the door B, to the bulk-head, is bolted a bracket C, having a journal box $c''$, through which passes a rod D, being of oblong or equivalent shape in cross-section and supporting it. Said rod D is provided with a square end $d$, to which a socketed bar, wrench, or equivalent device can be applied for imparting a quarter-turn to said rod when it is desired to close the door. Through another bearing in said bracket also passes a screw E, with the threads of which the toothed pivoted dogs or nuts G can be engaged and hold the door B in an elevated or closed position, the screw E having collars $g\ g'$ to take the thrust. There may be two or more parts in these dogs or nuts, which are arranged in such manner that by giving a quarter-turn to the rod D, as shown in dotted lines in Fig. 7, they will be released from the threads on said screw E and allow the door to move or drop by its own weight. In descending the door will be forced tightly against its seating surface and will be firmly held in place by the keepers $c\ c$. In the upper ends of the dogs or levers G are placed friction-rollers e to minimize the friction and reduce wear of the rod.

The shaft D can be extended to any of the upper decks of a vessel to be operated from them.

The parts are so constructed that the door will practically form an air and water tight door when closed, and yet can slide freely when opening or closing. It is well adapted for marine vessels, although applicable for use in mines, caissons, fireproof buildings, or any place requiring an air and water tight door. To raise the door the jaws are closed on the screw, which is then rotated. The screw is carried up to the same point as the shaft D, already referred to. The shaft D may be operated by electric, pneumatic, steam, hydraulic, hand, or other power.

If by any means the door should be stopped in its descent, the screw E can be re-engaged with the dogs and forced down in place to secure its positive seating. This is an important feature of my invention.

Having thus described my invention, what I claim, and desire to secure by Letters Patent, is—

1. In an automatic gravity-closing water-tight door operating mechanism, a pair of dogs having screw-threaded jaws pivoted to the door, said dogs serving as a divided nut, in combination with a rotatable screw journaled on the bulkhead above the door and adapted to be engaged by the threaded jaws of the dogs, and a rod of irregular shape in cross-section, journaled above the door and adapted to lie between the ends of the dogs and to operate said dogs by a partial rotation.

2. The gravity closing water-tight door provided with a bisected nut, a screw adapted to be engaged with said nut, a rod having a major and minor axis in cross-section to operate said nut, in combination with an opening in a bulkhead, as shown and set forth.

3. In gravity closing water-tight door mechanism, the combination of a door provided with pivoted dogs, having teeth, an operating screw adapted to be engaged by said teeth and arranged to be released by a rod, of unequal diameter in cross-section to operate said dogs, and which receives part of a revolution and permits the door to close by its own weight, as specified.

4. In gravity closing water-tight door mechanism, a door, pivoted dogs G attached to said door, having rollers e, a rod of unequal diameter in cross-section, adapted to actuate said dogs, and a screw, in combination with wedges and keepers constructed as shown, to seal said door tightly against its seating surface, all arranged as set forth.

5. In gravity closing water-tight door mechanism, a door, pivoted dogs having teeth and attached to said door, engaging with an operating screw E and adapted to be actuated by a rod D of unequal diameter in cross section attached to the bulkhead as specified.

6. The combination in a gravity closing door mechanism, with an opening that can be closed by said door, means for releasing it, consisting of a rod of irregular cross-section journaled to the bulkhead above the door, a divided nut G, attached to said door, and having teeth, and a screw E, with which said nut is adapted to engage and replace said door in its normal position and tighten it, as specified.

In testimony whereof I affix my signature in presence of two witnesses.

GEORGE W. MELVILLE.

Witnesses:
JAMES H. PERRY,
B. C. BRYAN.